United States Patent [19]

Shinojima et al.

[11] Patent Number: 5,726,889
[45] Date of Patent: Mar. 10, 1998

[54] AUTOMATIC TRANSMISSION WITH REDUCED TIME FOR HOOKED GEAR CHANGE

[75] Inventors: Takumi Shinojima; Yuki Sasa; Shigemori Onuki, all of Kawasaki, Japan

[73] Assignee: Isuzu Motors Limited, Tokyo, Japan

[21] Appl. No.: 429,131

[22] Filed: Apr. 26, 1995

[30] Foreign Application Priority Data

May 11, 1994 [JP] Japan .................. 6-097145

[51] Int. Cl.$^6$ .............................. G06G 7/70; B60K 44/04
[52] U.S. Cl. .................. 364/424.093; 364/424.08; 364/424.084; 364/424.001; 74/335; 477/34; 477/127
[58] Field of Search ................. 364/424.01, 424.1; 477/124, 77, 109, 123, 80, 71, 34, 36, 127; 74/325, 336 R, 473 R, 335; 192/3.58, 3.68, 9, 3.63, 3.55, 3.51

[56] References Cited

U.S. PATENT DOCUMENTS

| 4,601,369 | 7/1986 | Hattori et al. | 192/3.58 |
|---|---|---|---|
| 4,618,040 | 10/1986 | Honma et al. | 192/0.09 |
| 4,638,690 | 1/1987 | Hattori et al. | 364/424.1 |
| 4,643,048 | 2/1987 | Hattori et al. | 364/424.1 |
| 4,645,045 | 2/1987 | Takefuta | 364/424.1 |
| 4,677,800 | 7/1987 | Hattori et al. | 74/858 |
| 4,778,038 | 10/1988 | Ohkawa et al. | 192/103 F |
| 4,784,007 | 11/1988 | Ishida | 74/335 |
| 4,884,667 | 12/1989 | Koga | 192/3.55 |
| 5,007,299 | 4/1991 | Bulgrien | 364/424.08 |
| 5,388,476 | 2/1995 | Harger et al. | 74/473 R |

*Primary Examiner*—Jacques Louis-Jacques

[57] ABSTRACT

An automatic transmission can automatically change gears as if it were manually operated when a gearshift lever is operated in a large-sized car. When a gear changing operation is found to be of a hooked type, a gear drawing or shifting control is carried out according to the position of the gearshift lever. Subsequently, without any recognition of the neutral position, a gear selecting control and then the next gear shifting control are performed.

6 Claims, 6 Drawing Sheets

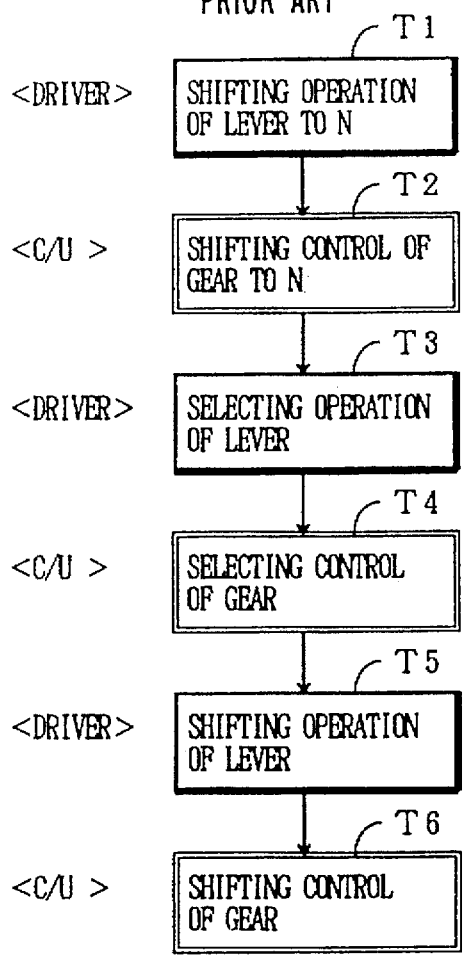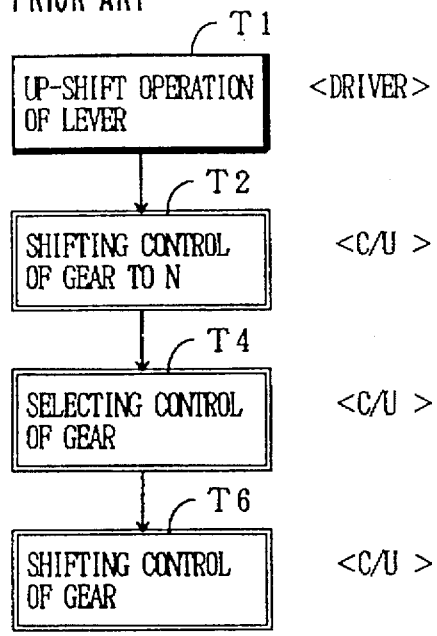

| GEAR POSITION \ SW2 | SHA | N E | SHB | SgA | SgB | SgC | SgD |
|---|---|---|---|---|---|---|---|
| R |  |  | ○ | ○ |  |  |  |
| 1 | ○ |  |  | ○ |  |  |  |
| 2 |  |  | ○ |  | ○ |  |  |
| 3 | ○ |  |  |  | ○ |  |  |
| 4 |  |  | ○ |  |  | ○ |  |
| 5 | ○ |  |  |  |  | ○ |  |
| 6 |  |  | ○ |  |  |  | ○ |
| 7 | ○ |  |  |  |  |  | ○ |
| N1 |  | ○ |  | ○ |  |  |  |
| N2 |  | ○ |  |  | ○ |  |  |
| N3 |  | ○ |  |  |  | ○ |  |
| N4 |  | ○ |  |  |  |  | ○ |

GEAR CHANGE TO OPPOSITE SIDE
(EX:2ND → 3RD GEAR CHANGE)

HOOKED GEAR CHANGE
(EX:3RD → 4TH GEAR CHANGE)

AUTOMATIC TRANSMISSION WITH REDUCED TIME FOR HOOKED GEAR CHANGE

BACKGROUND OF THE INVENTION

1. Field of the Invention

The present invention relates to an automatic transmission, and in particular to an automatic transmission which can automatically change gears as if it were manually operated when a driver operated a gearshift (gear-change) lever in a large-sized car etc.

2. The Related Art

FIG. 1 schematically shows one prior art automatic transmission, using an air controlled-transmission. When changing gears in this prior art transmission, a driver usually clutches out by depressing a clutch pedal 3 and operates a gearshift lever 1 to a desired lever position as in a conventional manually-operated car.

This gearshift lever 1 is associated with a switch unit SW1 shown by dotted lines for detecting "shifting position" and "selecting position" of the lever 1. In response to the output from the switch unit SW1, a control unit C/U drives a transmission T/M according to the position of the gearshift lever 1, receives a feedback signal from a switch unit SW2 for detecting a gear position of the transmission T/M so that the transmission T/M may be controlled to a desired gear position, and makes an indicator IND to indicate which gear position is now set by such a gear shift. The driver is to clutch in after having recognized or confirmed the gear position indicated by the indicator IND.

The operation of the gear change will be described in more detail referring to FIGS. 1, 2A, 2B and 3.

FIG. 2A schematically shows a flow of operation of the above gear change. When the driver performs a shifting operation of the lever 1 (at Step T1) as, for example, shifting (or drawing) the gear from the 2nd gear position to a selected position N2 which is a neutral position, the control unit C/U performs a shifting control of the gear of the transmission T/M to the selected position N2 in accordance with the output of the lever position detecting switch unit SW1 until a neutral position switch NE for detecting the neutral position and a switch SgB for detecting the selected position N2 in the gear position detecting switch unit SW2 are simultaneously made ON as shown by ○ marks in FIG. 3 (at Step T2).

When both of the switch NE and the switch SgB at the selecting position N2 are made ON, from the output of the switch unit SW1 generated by a selecting operation (at Step T3) of the lever 1 by the driver, the control unit C/U performs a selection control (at Step T4) of the gear to a corresponding position among selection positions N1–N4. Assuming that the driver performs a selection operation of the lever 1 to the 4th gear position, the control unit C/U performs the selection control to a position at which a switch SgC for detecting the selection position N3 corresponding to the 4th gear position is made ON.

Subsequently, when the driver performs a shifting operation (at Step T5) of the lever 1, the control unit C/U performs the shifting control (at Step T6) of the gear to a corresponding shifting position. In this example, the control unit C/U performs the shifting control to a position at which a switch SHB for detecting the 4th gear position is made ON.

Thus in this prior art transmission, a driver must perform gear changing operations via several gear positions so that the transmission T/M may be controlled in accordance with the gear changing operations, disadvantageously resulting in a lot of operational manhours for a driver.

Therefore, a gearshift lever in a second prior art transmission as shown in FIG. 4 has been proposed for the purpose of reducing such operational manhours.

This gearshift lever has only two positions N and H at the selecting direction along the neutral line, only a shifting position R and the 1st gear position at a selecting position N, and only an up-shift position UP and a down-shift position DOWN at a selecting position H.

With respect to the shifting direction, the 1st gear position and the down-shift position DOWN are commonly detected by a switch StA, the neutral positions N and H are commonly detected by a switch StB, and the shifting position R and the up-shift position UP are commonly detected by a switch StC. With respect to the selecting direction, the 1st gear position and the positions N and R are commonly detected by a switch SeA while the down-shift DOWN, the neutral position H, and the up-shift position UP are commonly detected by a switch SeC.

This gear shift lever is so simplified that it makes an up-shift of a single step by a single operation when a driver changes up, and makes a down-shift of a single step by a single operation when a driver changes down.

Namely, as shown in FIG. 2B, after a driver performs for example an up-shift operation of the lever (at Step T1), he can only perform continuously a shifting control of gear to N (at Step T2), a selection control of gear (at Step T4), and a shifting control of gear (at Step T6). This can eliminate a selection operation (at Step T3) and a shifting operation (at Step T5) of the gearshift lever as shown in FIG. 2A.

However, in the 2nd prior art transmission, the gearshift lever requires only up-shift and down-shift positions, whereas the control of the transmission has a different gear changing time between "gear change to opposite side" shown in FIG. 5A and a so-called "hooked gear change" shown in FIG. 5B.

Namely, as shown in FIG. 5A, when a driver is going to change up from e.g. the 2nd gear position to the 3rd gear position opposite to the 2nd gear position as seen from FIG. 1, he can only perform an up-shift operation (at Step S11) for the gearshift lever, and then a shifting control of the gear to the 3rd gear position (at Step S12) is to be made by a control unit (not shown).

Meanwhile, for example, when a driver is going to change up from e.g. the 3rd gear position to the 4th gear position, which means the above-noted "hooked gear change", an up-shift operation on the lever (at Step S1) is made and then a shifting control of the gear to the neutral position (at Step S2) is made, as shown in FIG. 5B.

For this control, it is checked (at Step S3) whether or not a shifting position switch SHA for detecting the 3rd gear position in the gear position detecting switch unit SW2 (see FIG. 1) is made OFF. If the switch SHA is found to be ON, this program will be repeated between Steps S2–S3 until it is made OFF. At the time when the switch SHA is made OFF, it is then checked (at Step S4) whether or not a switch SgB for detecting the selecting position N2 along the neutral line is made ON. Only if it is found to be ON, the program will go to the next selecting control of gear (at Step S5).

In this gear selecting control, on the condition that the switch SgB at the selecting position N2 along the neutral line is made OFF (at Step S6) and the switch SgC at the selecting position N3 is made ON (at Step S7), the program will go to the next gear shifting control (at Step S8).

This gear shifting control is made for the 4th gear position according to the output of the switch SHB.

As is apparent from FIGS. 5A and 5B, a time for the gear change to the opposite side requires about 50 ms, whereas a time for the hooked gear change requires about 100 ms. The existence of such a time difference of about 50 ms will give incompatibility to a driver.

Also, since a driver sensually knows when he should clutch in after a completed shifting operation of the gearshift lever at a glance of the indicator IND, he must clutch in much earlier. As a result, the control unit C/U will judge that the driver has unintentionally clutched in and perform a gear shifting control to the neutral position.

SUMMARY OF THE INVENTION

Accordingly, it is an object of the present invention to provided an automatic transmission which is capable of reducing a time for a hooked gear change as much as possible.

For the achievement of the above noted object, an automatic transmission according to the present invention comprises; gearshift means for making an up-shift or a down-shift of a single step by a single operation; a first detecting means for a position of the gearshift means; a second detecting means for a shifting position and a selecting position of a gear; and, control means for performing a shifting control of the gear to a neutral position if a gear changing way of the gearshift means is found to be a hooked type on the basis of the present position of the gearshift means when operated and the last shifting and selecting positions of the gear, subsequently for performing a selection control without recognizing from an output of the second detecting means whether or not the shifting position of the gear is neutral, and subsequently for performing the next shifting control after recognizing from the output of the second detecting means that the selection control has been completed in the neutral position.

In the present invention, the first detecting means may comprise six detecting switches in which three detecting switches are in each of two selecting positions and two detecting switches are in each of three shifting positions.

The second detecting means may comprise twelve detecting switches are in which three detecting switches in each of four selecting positions and four detecting switches are in each of three shifting positions.

The control means may include a memory for storing the last shifting and selecting positions of the gear before the gearshift means is operated.

The present invention may further comprise indicator means for indicating the result of the gear change performed by the control means so that a driver may clutch in.

According to the present invention, the control unit determines whether or not a driver requires a hooked gear change from the present lever position when the gearshift lever is operated and the last shifting and selecting positions of the gear.

Consequently, if it is found that the hooked gear change is required, a gear shifting control is made corresponding to the position of the lever in like manner as the prior art, and then a gear selecting control will be made. Before going to the gear selecting control, no recognition or confirmation for the neutral position is made.

In succession of the gear selecting control, the next or the final gear shifting control is performed. Therefore, a time for determining whether or not a control has been made to the neutral position can be eliminated and a time for gear change can be reduced.

BRIEF DESCRIPTION OF THE DRAWINGS

FIGS. 2A and 2B are flow charts respectively illustrating a gear changing control in the first and second prior art transmission;

Throughout the Figures, like reference numerals indicate like or corresponding components.

DETAILED DESCRIPTION OF THE PREFERRED EMBODIMENT

Hereinafter, an embodiment of an automatic transmission according to the present invention will be described.

Figures 3, 4:
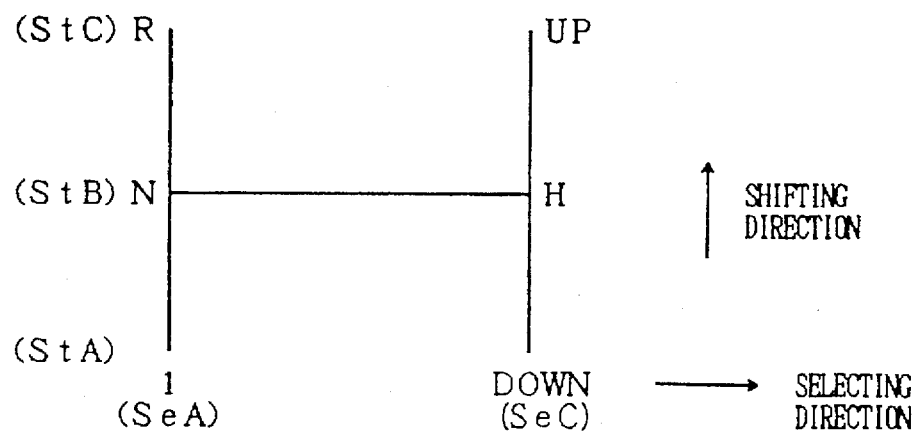
FIG. 3 is an operational chart of a gear position detecting switch unit in the first prior art transmission.
FIG. 4 is a diagram illustrating a simplified gearshift lever used for the second prior art and the present invention.
Figure 6:
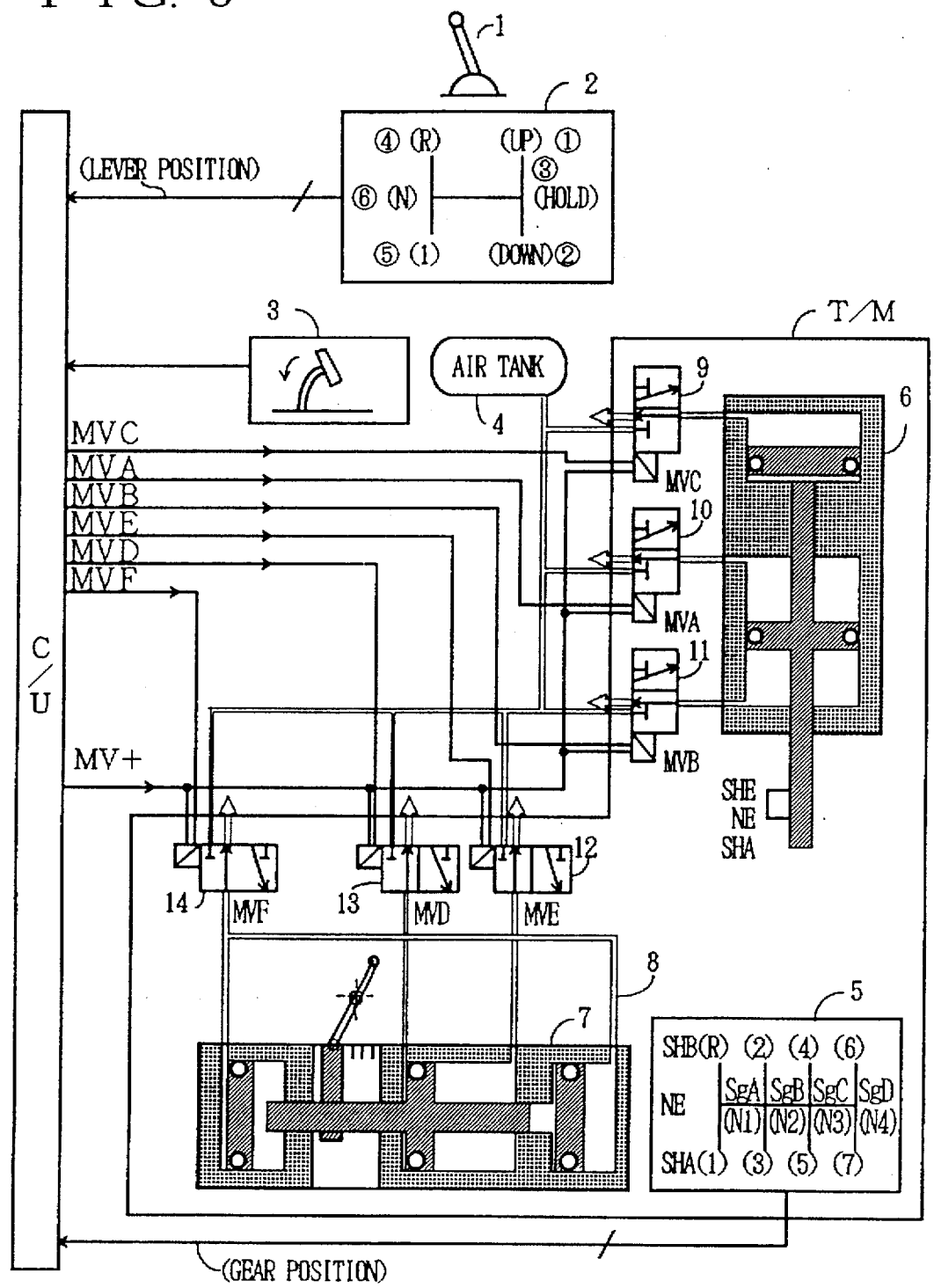
FIG. 6 is a system diagram of the automatic transmission according to the present invention; and, FIG. 7 is a flow chart illustrating a gear changing control (from the 3rd gear to the 4th gear) executed by a control unit in the automatic transmission according to the present invention.

FIG. 6 shows a system arrangement of one embodiment of an automatic transmission according to the present invention. In the Figure, a gearshift lever 1 which is the same as the gearshift lever shown in FIG. 4 is provided with a lever position detecting switch unit 2 for detecting six lever positions ①–⑥. The outputs of the lever position detecting switch unit 2 are provided for the control unit C/U as lever position signals.

The control Unit C/U also receives an output signal from a clutch pedal 3.

An air tank 4 provides air for a transmission T/M to perform a selection control and a shifting control with the air pressure thereof.

Figure 1:
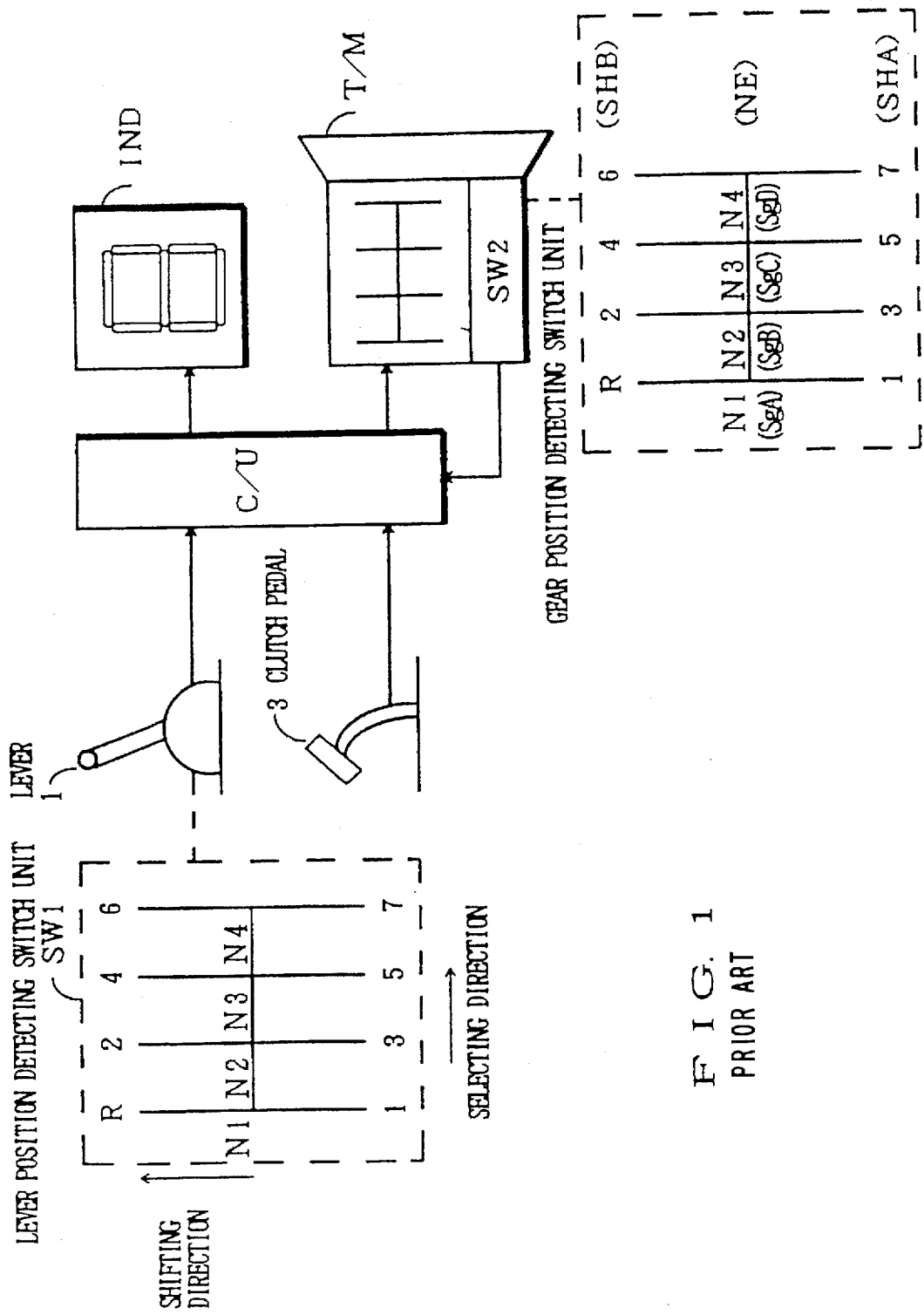
FIG. 1 is a schematic diagram illustrating a first prior art transmission.

The transmission T/M is provided with a gear position detecting switch unit 5 corresponding to the switch unit SW2 shown in FIG. 1, a shifting actuator 6, and a selecting actuator 7, the actuators 6, 7 being connected to an air pressure pipe 8 for leading air from the air tank 4.

To the shifting actuator 6 is connected a neutral valve (MVC) 9, a shifting valve (MVA) 10 for the 1st, 3rd, 5th, and 7th gears, and a shifting/neutral valve (MVB) 11 for the R (Reverse), 2nd, 4th, and 6th gears with the air pressure pipe 8. The valves 9–11 are switched over by control signals from the control unit C/U.

Likewise, to the selecting actuator 7 is connected a selecting valve (MVE) 12 for neutral positions N3, N4, a selecting valve (MVD) 13 for neutral positions N1, N2, and a selecting valve (MVF) 14 for the neutral positions N2, N3 also with the air pressure pipe 8. The valves 12–14 are switched over by control signals from the control unit C/U.

The gear position detecting switch unit 5 like the switch unit SW2 in FIG. 1 includes switches SHA, NE, and SHB for detecting a gear shifting direction (position) of the transmission T/M and switches SgA–SgD for detecting a gear selecting direction (position) thereof. The outputs of these switches are provided as gear position detecting signals for the control unit C/U.

Figure 7:
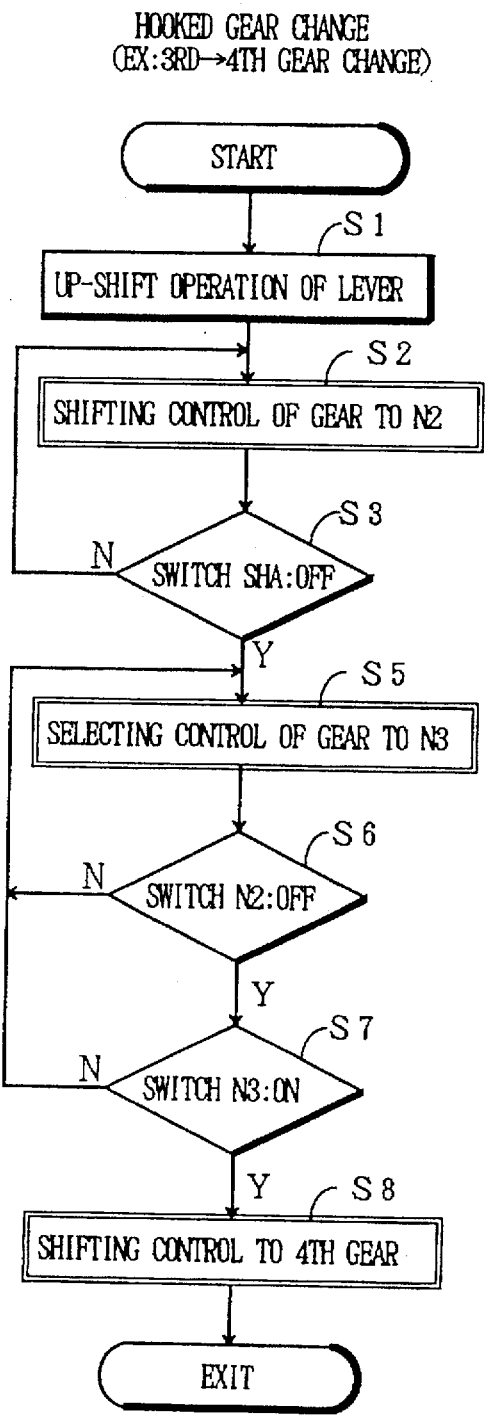

FIG. 7 shows a control algorithm executed by the control unit C/U shown in FIG. 6. Particularly, this control algorithm treats a "hooked up-shift operation" from the 3rd gear to the 4th gear as an example.

Figure 5A:
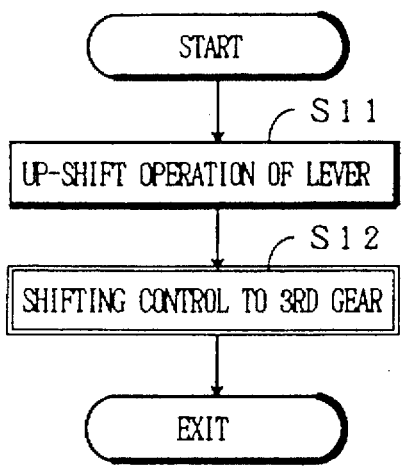
FIGS. 5A and 5B are flow charts respectively illustrating a gear changing control of the second prior art transmission.
Figure 5B:
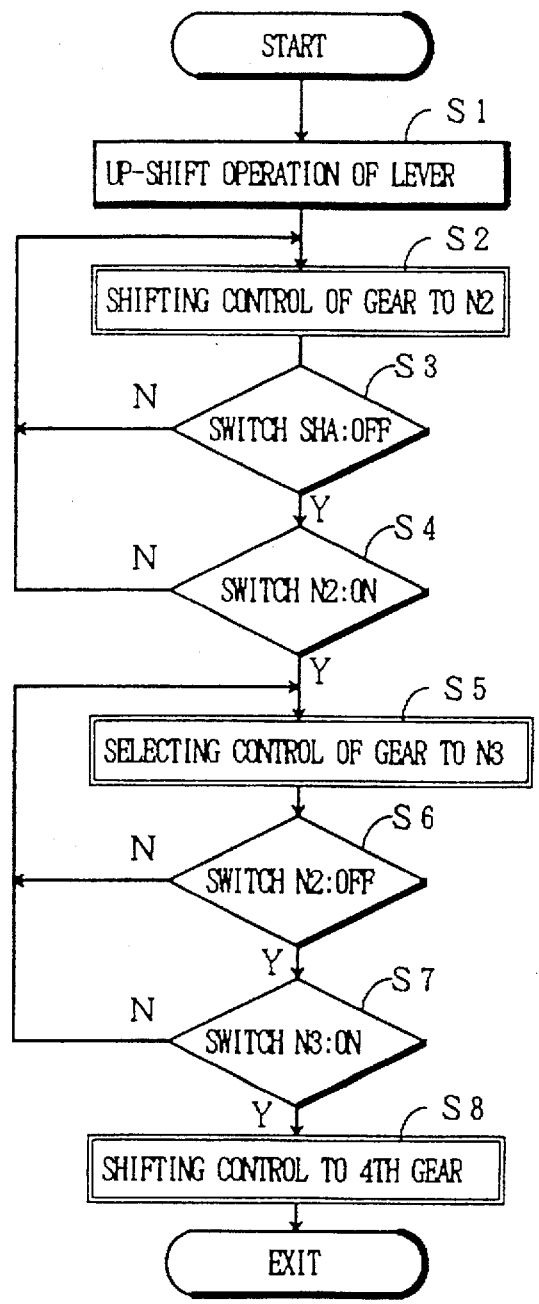

By comparison of the flow chart in FIG. 7 with the flow chart in FIG. 5B, it will be seen that both have the same processes except for Step S4 in FIG. 5B.

Namely, the present invention does not have a decision process shown at Step S4 in FIG. 5B as to whether or not the switch SgB at the selecting position N2 is made ON.

Therefore, the control unit C/U will proceed to the next gear selection control even though the gear does not move to the selecting position N2, so that a time in question of the gear how long it has moved in the neutral selecting position before the selection control can be eliminated.

A time for the hooked gear change in the prior art actually measured was about 100 ms whereas it was about 75 ms in the present invention. The present invention could reduce the said time by about 25 ms compared with the prior art.

It should be noted that a gear change to opposite side is to be made as shown in FIG. 5A while a discrimination between the gear change to opposite side and the hooked gear change in FIG. 5B depends on the present gear position (shifting position and selecting position) and whether a shifting direction by the gearshift lever indicates an up-shift or down-shift. Accordingly, they can be easily discriminated by being preliminarily stored in the form of a memory map.

As above described, in the automatic transmission according to the present invention, when a gear change is found to be a hooked type, a gear shifting control to neutral is performed corresponding to the position of a gearshift lever and then a gear selection control is continuously performed regardless of gear neutral positions. At the same time when the gearshift lever is shifted to neutral from the present position, the lever is moved to the next shifting position so that a quick selecting operation can be attained.

Accordingly, an expected shifting control in which an operational delay is expected can be made because of the next target gear position being reached without any change, whereby a time for a hooked gear change can be largely reduced and a driver's feeling of gear change is improved.

Having described the present invention by way of the preferred embodiment, it can be seen how the objects of the invention have been attained. As this invention may be embodied in several forms without departing from the spirit of the invention, the present embodiment is therefore illustrative and not restrictive since the scope of the invention is defined by the appended claims and includes such equivalent forms as will be apparent to those skilled in the art.

We claim:

1. An automatic transmission control apparatus comprising:

gearshift means for making an up-shift or a down-shift of a single step by a single operation;

first detecting means for detecting a position of said gearshift means;

second detecting means for detecting a shifting position and a selecting position of a gear; and, control means for performing a shifting control of said gear to a neutral position if a gear changing operation of said gearshift means is determined to be a hooked type on the basis of a present position of said gearshift means when operated and the last shifting and selecting positions of said gear, subsequently for performing a selection control without recognizing from an output of said second detecting means whether or not the shifting position of said gear is neutral, and subsequently for performing the next shifting control after recognizing from the output of said second detecting means that said selection control has been completed in the neutral position.

2. An automatic transmission control apparatus according to claim 1, wherein said first detecting means comprises six detecting switches including three detecting switches in each of two selecting positions and two detecting switches in each of three shifting positions.

3. An automatic transmission control apparatus according to claim 2, wherein said second detecting means comprises twelve detecting switches including three detecting switches in each of four selecting positions and four detecting switches in each of three shifting positions.

4. An automatic transmission control apparatus according to claim 1, wherein said control means includes a memory map for storing the last shifting and selecting positions of said gear before said gearshift means is operated.

5. An automatic transmission control apparatus according to claim 4, further comprising indicator means for indicating the result of the gear change performed by said control means so that a driver may clutch in.

6. A method for operating an automatic transmission, comprising:

detecting a current position of a gearshift;

detecting a shifting position and a selecting position of a gear;

performing a shifting control of the gear to a neutral position if a gear changing operation of the gearshift is determined to be a hooked type on the basis of the current position of the gearshift when operated and the last shifting and selecting positions of the gear;

subsequently performing selection control without recognizing whether the shifting position of the gear is neutral; and subsequently performing a next shifting control after detecting that the selection control has been completed in the neutral position.

* * * * *